US012641126B2

(12) United States Patent
Guy et al.

(10) Patent No.: US 12,641,126 B2
(45) Date of Patent: *May 26, 2026

(54) METHOD FOR CONFIGURING ACTIONS RESPONSIVE TO CONDITIONS OF ASSETS CONNECTED TO A COMPUTER NETWORK

(71) Applicant: Arctic Wolf Networks, Inc., Eden Prairie, MN (US)

(72) Inventors: Jeffrey J. Guy, Austin, TX (US); Dean Mekkawy, Austin, TX (US); Jeremiah Clark, Austin, TX (US); Nevins Bartolomeo, Austin, TX (US); Aaron Griffin, Austin, TX (US); Michael Alfonse, Austin, TX (US); Jacob Hackett, Austin, TX (US); Nick Murdock, Austin, TX (US); Jim LoRusso, Austin, TX (US); Jason McFarland, Austin, TX (US); Luis Diego Cabezas, Austin, TX (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 119 days.

This patent is subject to a terminal disclaimer.

(21) Appl. No.: 18/541,405

(22) Filed: Dec. 15, 2023

(65) Prior Publication Data

US 2024/0187455 A1 Jun. 6, 2024

Related U.S. Application Data

(63) Continuation of application No. 18/101,404, filed on Jan. 25, 2023, now Pat. No. 11,882,157.

(60) Provisional application No. 63/302,968, filed on Jan. 25, 2022.

(51) Int. Cl.
*H04L 9/40* (2022.01)

(52) U.S. Cl.
CPC .................................... *H04L 63/20* (2013.01)

(58) Field of Classification Search
CPC ...................................................... H04L 63/20
USPC ............................................................ 726/1
See application file for complete search history.

(56) References Cited

U.S. PATENT DOCUMENTS

| 10,389,742 B2 | 8/2019 | Reddy et al. |
| 10,855,715 B2 | 12/2020 | Martin et al. |
| 2018/0139227 A1 | 5/2018 | Martin et al. |
| 2021/0150269 A1* | 5/2021 | Choudhury ........ G06V 30/1985 |

(Continued)

OTHER PUBLICATIONS

Heberle et al. "InteractiVenn: a web-based tool for the analysis of sets through Venn diagrams", BMC Bioinformatics (2015), 7 pages.

(Continued)

*Primary Examiner* — Anthony D Brown

(74) *Attorney, Agent, or Firm* — Barnes & Thornburg LLP

(57) ABSTRACT

A method includes: generating a manifest of assets during the target time interval; labeling each asset in the manifest of assets with a set of attributes exhibited by the asset during the target time interval; defining a first attribute category exhibiting a first combination of attributes; assigning a first action to the first attribute category; identifying a subset of assets in the manifest of assets matching the first attribute category, each asset in the subset of assets exhibiting a set of attributes including the first combination of attributes; and executing the first action on the first subset of assets.

20 Claims, 5 Drawing Sheets

(56)          References Cited

U.S. PATENT DOCUMENTS

| | | | | |
|---|---|---|---|---|
| 2022/0224724 | A1* | 7/2022 | Bazalgette | H04L 63/1441 |
| 2022/0225101 | A1* | 7/2022 | Fellows | H04L 41/16 |
| 2022/0385974 | A1* | 12/2022 | Phillips | G06N 3/04 |
| 2023/0009127 | A1* | 1/2023 | Boyer | H04L 41/16 |

OTHER PUBLICATIONS

Non-Final Office Action for U.S. Appl. No. 17/720,163, dated Aug. 29, 2022.

* cited by examiner

METHOD FOR CONFIGURING ACTIONS RESPONSIVE TO CONDITIONS OF ASSETS CONNECTED TO A COMPUTER NETWORK

CROSS-REFERENCE TO RELATED APPLICATIONS

This application is a continuation of U.S. patent application Ser. No. 18/101,404, filed on 25 Jan. 2023, which claims the benefit of U.S. Provisional Application No. 63/302,968, filed on 25 Jan. 2022, each which is incorporated in its entirety by this reference.

This application is related to U.S. patent application Ser. No. 17/720,163, filed on 13 Apr. 2022, which is incorporated in its entirety by this reference.

TECHNICAL FIELD

This invention relates generally to the field of Internet security and more specifically to a new and useful method for configurating actions responsive to conditions of assets connected to a computer network within the field of Internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

Figure 1:
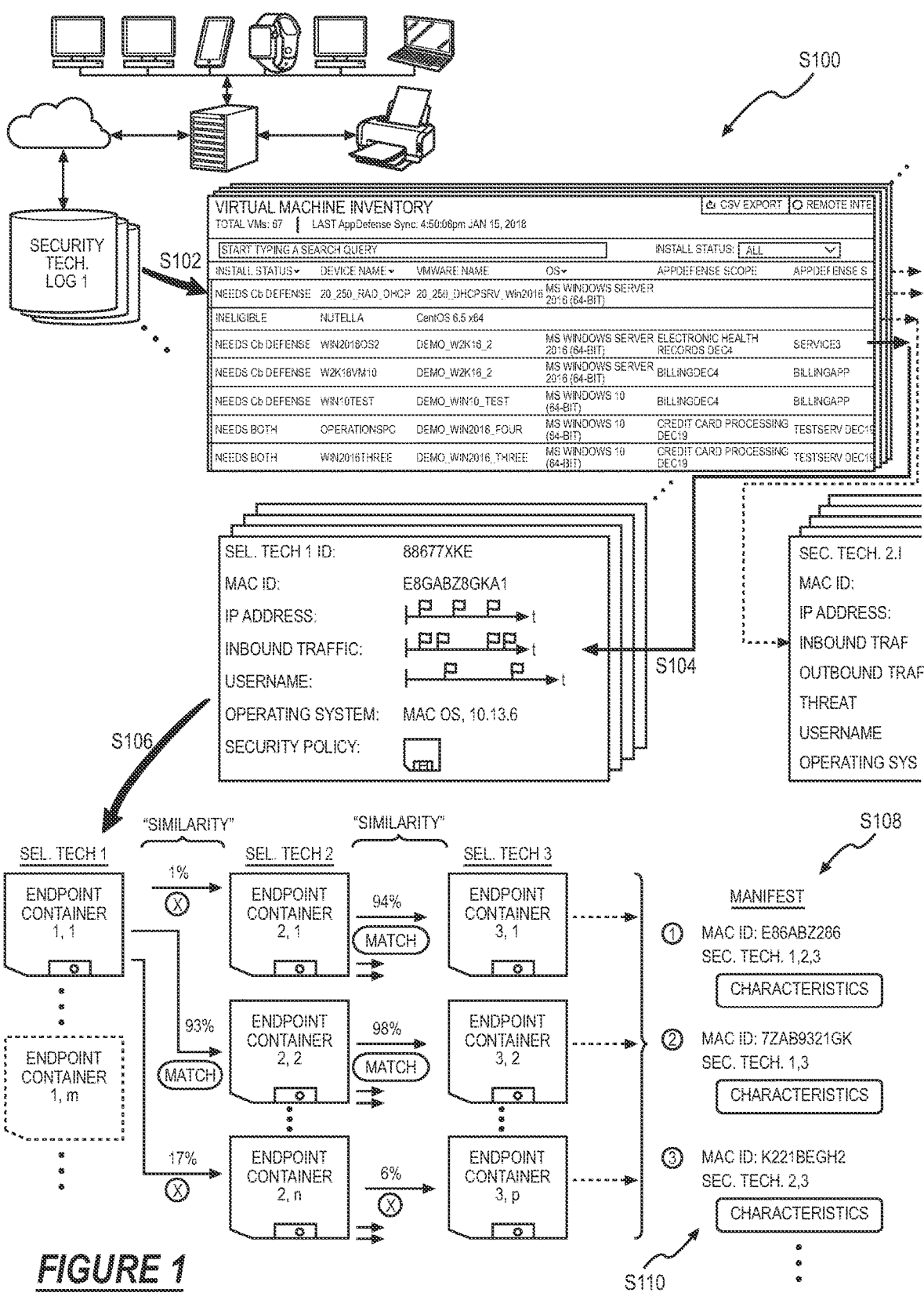
FIG. 1 is a flowchart representation of a method.
Figure 2:
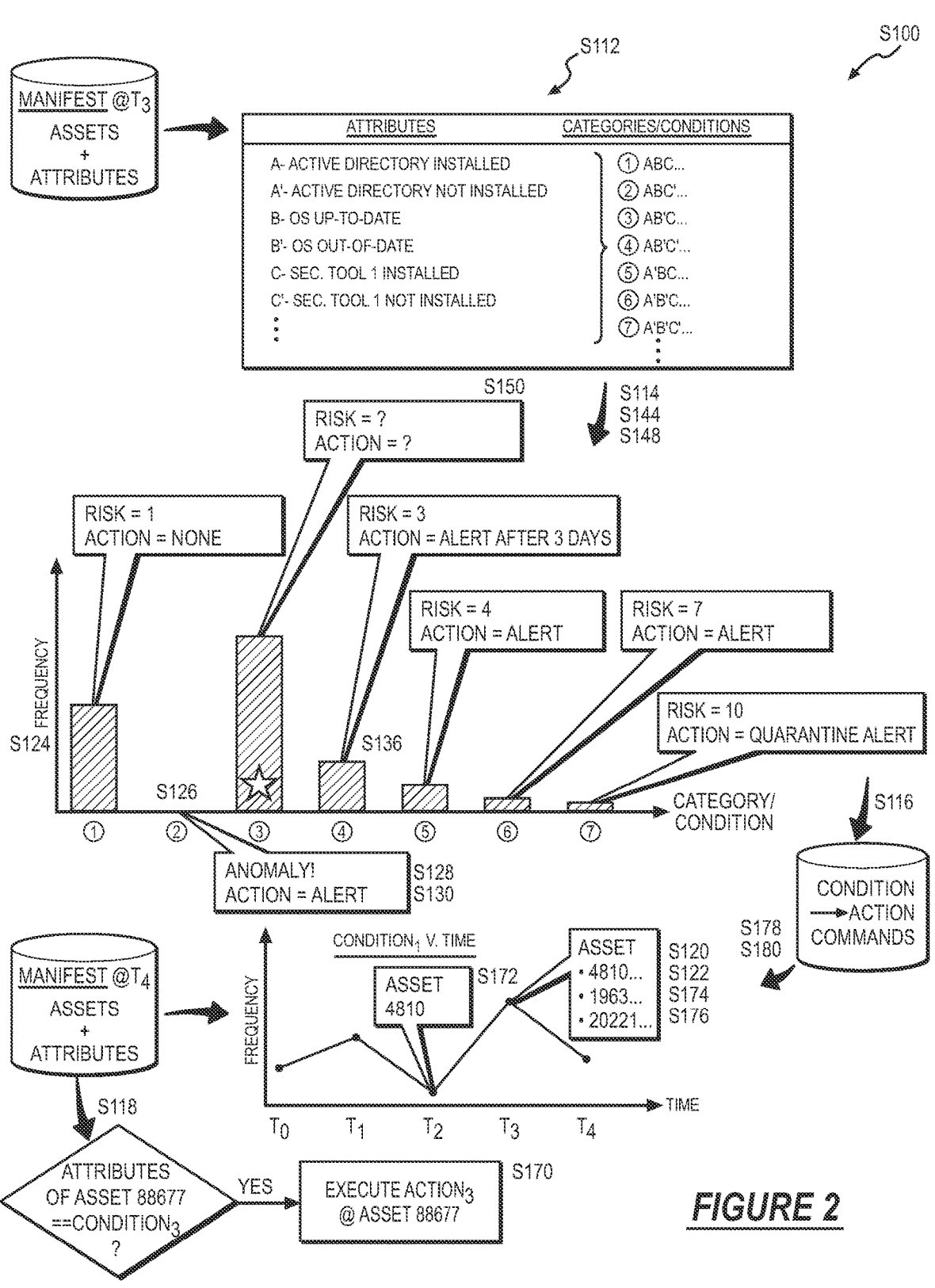
FIG. 2 is a flowchart representation of one variation of the method.

As shown in FIGS. 1 and 2, a method S100 for executing actions responsive to conditions at assets on a computer network includes: accessing a first set of objects, generated by a set of sources during a first time interval, representing attributes of a first set of assets in Block S102; partitioning the first set of objects into a first set of object groups, each object group in the first set of object groups representing a particular asset in the first set of assets in Block S104; generating a first set of asset containers by, for each object group in the first set of object groups, aggregating objects in the object group into an asset container, in the first set of asset containers, representing attributes of a particular asset in the first set of assets in Block S106; generating a first manifest of assets during the first time interval based on the first set of asset containers in Block S108; and labeling each asset in the first manifest of assets with a set of attributes exhibited by the asset during the first time interval based on a corresponding asset container in the first set of asset containers in Block S110.

The method S100 further includes: defining a first attribute category exhibiting a first combination of attributes in Block S112; assigning a first action to the first attribute category in Block S116; identifying a first subset of assets in the first manifest of assets matching the first attribute category, each asset in the first subset of assets exhibiting a set of attributes including the first combination of attributes in Block S120; and executing the first action, assigned to the first attribute category, on the first subset of assets in Block S168.

1.1 Variation: First Asset

As shown in FIGS. 1 and 2, one variation of the method S100 for executing actions responsive to conditions at assets on a computer network includes: accessing a set of objects, generated by a set of sources during a target time interval, representing attributes of a first set of assets including a first asset in Block S102; partitioning the set of objects into a set of object groups including a first object group representing the first asset in Block S104; generating a first asset container in a set of asset containers in Block S106, the first asset container including objects in the first object group and representing attributes of the first asset; generating a manifest of assets during the target time interval based on the set of asset containers in Block S108, the manifest of assets including the first asset; and labeling the first asset in the first manifest of assets with a first set of attributes exhibited by the first asset during the target time interval based on the first asset container in Block S110.

This variation of the method S100 further includes: defining a first attribute category exhibiting a first combination of attributes in Block S112; assigning a first action to the first attribute category in Block S116; and, in response to detecting a match between the first set of attributes and the first combination of attributes, executing the first action, assigned to the first attribute category, on the first asset in Block S168.

1.2 Variation: Risk Score

As shown in FIGS. 1 and 2, one variation of the method S100 for executing actions responsive to conditions at assets on a computer network includes: generating a set of asset containers by, for each asset in a set of assets, aggregating objects, generated by a set of sources during a target time interval, representing the asset into an asset container, in the set of asset containers, representing attributes of the asset in Block S106; generating a manifest of assets during the target time interval based on the set of asset containers in Block S108; and labeling each asset in the manifest of assets with a set of attributes exhibited by the asset during the first time interval based on a corresponding asset container in the set of asset containers in Block S110.

This variation of the method S100 further includes: defining a first attribute category exhibiting a first combination of attributes in Block S112; assigning a first risk score to the first attribute category based on proximity of the first combination of attributes to a target combination of attributes defined in a security policy in Block S114; assigning a first action to the first attribute category based on the first risk score in Block S116; identifying a subset of assets in the manifest of assets matching the first attribute category, each asset in the subset of assets exhibiting a set of attributes including the first combination of attributes in Block S120; and executing the first action, assigned to the first attribute category, on the subset of assets in Block S168.

2. APPLICATIONS

Generally, a computer system (e.g., a local or remote computer system connected to or interfacing with a computer network) can execute Blocks of the method S100: to aggregate objects from various tools, systems, and other properties deployed on a first set of assets (e.g., endpoint devices, software applications, users) connected to a computer network during a first time interval; to fuse these objects into an accurate inventory (or "manifest") of assets connected to the computer network during the first time interval; to define attribute categories representing unique combinations of attributes—across multiple attribute classes—of the first set of assets; and to assign automated actions (e.g., alert, quarantine) to these attribute categories. The computer system can then: repeat this process to derive an accurate inventory of assets connected to the computer network during each subsequent time interval; match attributes of these assets to attribute categories; and automatically execute corresponding actions on these assets.

In particular, the computer system can execute Blocks of the method S100 to configure, manage, and execute actions responsive to specific conditions (i.e., combinations of attribute in various attribute classes) at assets connected to the computer network, such as automatic alerts and quarantining. The computer system can further execute Blocks of the method S100 to generate metrics and visualizations (e.g., charts, trendlines): of asset frequency within individual attribute categories over time; of individual assets moving between attribute categories over time; and/or of distribution of assets between attribute categories over time; etc.

For example, when an asset that is properly configured with target security tools installed (i.e., an asset that exhibits target attributes), various security tools and other software installed on the asset and the computer network can detect and publish particular attributes of the asset in discrete, unreconciled feeds. Failure to properly fuse attributes of the asset from these resources may yield: false interpretation of one true asset as two phantom assets with different attributes; false positive detection of two phantom assets, each matching a predefined risky condition; and/or improper execution of two actions—assigned to these predefined risky conditions—on the true asset. Therefore, incomplete or incorrect inventory of assets connected to the computer network may: produce a high rate of false positions of assets that meet other than target conditions; reduce efficacy of predefined actions responsive to detecting such conditions; and/or reduce or eliminate significance of changes in attributes of an asset over time.

Accordingly, the computer system can execute Blocks of the method S100 to: aggregate attributes—collected across multiple resources connected to the computer network—into accurate representations of asset inventory on the computer network over time; configure a set of conditions (or "attribute categories") based on combinations of attributes of true assets currently or previously detected on the computer network; assign actions to these conditions; and automatically execute these conditions based on attributes of true assets detected on the computer network over time.

The computer system can also execute Blocks of the method S100 to: generate accurate metrics for frequencies of assets that fall into and move between these conditions over time; and present these metrics to a user (e.g., security personnel) to enable the user to monitor and comprehend true asset statuses, asset status trajectory, and network risk over time.

2.1 Terms

The computer system and an operator portal are described herein as executing Blocks of the method S100 to characterize and visualize (e.g., real-time, historical) security technology deployment efficacy across devices connected to the computer network based on logs published by these security technologies. Additionally or alternatively, the computer system and/or the operator portal can execute Blocks of the method S100 to: call application programming interfaces (or "APIs") hosted by these security technologies (or "sources") for objects detected by these security technologies; fuse objects returned by these security technologies; characterize attributes of assets on the computer network accordingly; and execute actions for assets on the computer network based on their attributes.

Furthermore, the computer system and the operator portal can execute Blocks of the method S100 to characterize and visualize: attributes of computing resources owned by an organization (e.g., laptop computers and printers owned by the organization and provided to employees); and/or attributes of computing devices accessing resources supplied by the organization (e.g., personal smartphones accessing virtual drives or email accounts owned by the organization; personal computing devices connecting to organization resources through VPN) over time.

The computer system can additionally or alternatively execute Blocks of the method S100 to characterize and visualize attributes of assets, including configurations of traditional Internet technology tools, authentication platforms, Cloud/SaaS applications, endpoint security technologies, firewalls, etc. installed on or accessed by these assets.

The method S100 as described herein is executed by the computer system to: compile objects (and/or logs) published by a set of security technologies; and extract attributes corresponding to a set of assets based on these objects. However, the computer system can similarly execute Blocks of the method S100 to: compile objects (and/or logs) published by non-security technologies, productivity tools, IT management tools, SaaS web applications, team communication software, etc.; and extract attributes corresponding to a set of assets based on these objects.

2.2 Example

In one example, a security protocol for the computer network can specify deployment of a first endpoint security technology and a second endpoint security technology (hereinafter "security technologies") on all assets connected to the computer network.

At a particular time, the first security technology may be deployed on a first quantity of assets connected to the computer network, and an operator may interpret this first quantity of assets from objects published by the first security technology. Similarly, for this same time, the second security technology may be deployed on a second quantity of assets connected to the computer network, and the operator may interpret this second quantity of assets from objects published by the second security technology. The operator may assume that all assets connected to the computer network are properly configured with the first and second security technologies if the first and second quantities are identical. However, some assets in the first quantity may be configured with the first security technology only, and some assets in the second quantity may be configured with the second security technology only. Similarly, if the first and second quantities differ by a first difference, the operator may incorrectly assume that only this first difference of assets are incorrectly configured.

Furthermore, the operator may estimate a total quantity of assets connected to this computer network at this time based on the greater of the first and second quantities. However, the true quantity of assets connected to the computer network at this time may be (much) greater that the greater of the first and second quantities if each of the first and second security technologies are deployed on only subsets of the total quantity of assets connected to the computer network at this time.

Moreover, employees, personnel, guests, and other affiliates of the organization (hereinafter "users") may frequently: be hired and assigned new computing devices; be terminated; leave and return to the organization campus each day or over longer time periods with their computing devices; and/or connect organization-related and personnel devices to the computer network over time. Additionally or alternatively, virtual devices may be deployed onto and removed from the network over time but may exhibit attributes detected and tracked by the computer system similar to physical devices. Therefore, the total quantity of assets—both physical and virtual—connected to the computer network may change frequently (e.g., per minute, hour, or day) and may differ (significantly) from the operator's last estimated total quantity of assets affiliated with the computer network.

Therefore, the computer system can execute Blocks of the method to: identify a first set of assets connected to the computer network and on which the first security technology is deployed during a target time interval based on objects published by the first security technology during this target time interval; identify a second set of assets connected to the computer network and on which the second security technology is deployed during this target time interval based on objects published by the second security technology during this target time interval; identify an intersection and disjoints of these sets of assets based on similar and dissimilar identifiers and features contained in these objects; and then derive deployment efficacy metrics for the first and second security technologies based on the intersection and these disjoints, including accurate quantities of assets on which only one and both of the first and second security technologies are deployed.

3. ASSET IDENTIFICATION

Generally, as shown in FIG. 1, the computer system can detect and distinguish individual assets (e.g., physical devices, virtual devices, software applications, users, data)—in a set of assets across a set of asset classes (e.g., device asset class, software asset class, user asset class, data asset class)—connected to the computer network during discrete intervals, such as by: retrieving a set of objects (and/or registration logs, etc.) published by a set of security technologies (and/or non-security technologies, etc.) designated for deployment on the computer network; identifying correspondence between objects (e.g., based on fixed identifying data and/or variable status data); fusing this correspondence into a manifest, for each asset class, containing one identifier for each asset represented in at least one object in this set of objects; and labeling each asset in the manifest with each security technology—in the set of security technologies—that published at least one object corresponding to the asset.

3.1 Asset Identification by Sources

Blocks of the method S100 recite: accessing a first set of objects, generated by a set of sources during a first time interval, representing attributes of a first set of assets in Block S102; and partitioning the first set of objects into a first set of object groups, each object group in the first set of object groups representing a particular asset in the first set of assets in Block S104.

In one implementation, in Block S102, the computer system can access a set of objects, generated by a set of sources (e.g., security technologies, non-security technologies, productivity tools, IT management tools, SaaS web applications, team communication software) during a target time interval (e.g., a first time interval), representing attributes of a set of assets.

For example, the computer system can: access a first subset of objects, in the first set of objects, generated by a first source in the set of sources during the first time interval, representing attributes of a first subset of assets in the first set of assets; and access a second subset of objects, in the first set of objects, generated by a second source in the set of sources during the first time interval, representing attributes of a second subset of assets in the first set of assets.

In another implementation, in Block S104, the computer system can partition these objects into a set of object groups, each object group in the first set of object groups representing a particular asset in the first set of assets. For example, the computer system can partition the set of objects into a first object group—in the set of object groups—representing (or associated with) a first asset in the set of assets, each object in the first object group including fixed identifying data and/or variable status data associated with the first asset.

3.2 Asset Containers

Block S106 of the method S100 recites generating a first set of asset containers by, for each object group in the first set of object groups, aggregating objects in the object group into an asset container, in the first set of asset containers, representing attributes of a particular asset in the first set of assets.

Generally, the computer system can: partition the set of objects into object groups in Block S104, each object group corresponding to one asset; and, for each object group, aggregate objects in the object group into an asset container (e.g., "virtual container," device container, application container, user container, data container) including fixed identifying data (e.g., MAC address, operating system) and variable status data (e.g., IP address, location) representative of one unique asset in the set of assets in Block S106. More specifically, the computer system can: extract fixed identifying data and variable status data (or "attributes") from objects in an object group—published by different sources, but identified by the computer system as corresponding to the same asset—and compile this data into a composite (or "singular") container representing the asset.

For example, the computer system can: detect a first IP address value (e.g., denoted "IP101.23.213.1") corresponding to a first device in a first object published by a first source; detect a second IP address value (e.g., denoted "IP_address_101.23.213.1") corresponding to the first device in a second object published by a second source; correlate the first IP address value and the second IP address value as corresponding to an identical configuration for the first device (but in an inconsistent format and lexicon); and normalize the first IP address value and the second IP address value into a normalized IP address value. In this example, the computer system can also: detect a state value—representing a compromised state of the first device—in a third object published by the first source (which may not be captured in objects published by the second source); and detect a user identifier corresponding to the first device in a fourth object published by the second source (which may not be captured in objects published by the first source). The computer system can then compile the normalized IP address value, the state value, and the user identifier into a device container corresponding to the first device.

Accordingly, the computer system can consolidate objects—published by different sources—into one representation of fixed and variable identifying data for each unique asset, this representation including i) correlated (and normalized) data that is common across these security technologies and ii) raw data that is unique to a single source (and/or that may not be correlatable across sources). Therefore, the computer system can characterize an asset with a complete set of attributes in a consistent format and lexicon.

3.2.1 Asset Attributes

In one implementation, the computer system can generate an asset container specifying attributes (e.g., fixed identifying data, variable status data) representing the corresponding asset during a target time interval. More specifically, the computer system can generate a first asset container in a set of asset containers, the first asset container including objects in a first object group (e.g., object group associated with a first asset in a set of assets) and representing attributes of the first asset.

In one example, the computer system can generate a first device container specifying a first set of device attributes (e.g., device name, operating system, MAC address, IP address, group(s), tag(s)) representing a first device in a set of devices.

In another example, the computer system can generate a first application container specifying a first set of application attributes (e.g., application name, version, vendor, vulnerabilities, group(s), tag(s)) representing a first application in a set of applications.

In another example, the computer system can generate a first user container specifying a first set of user attributes (e.g., name, login username, employee identifier, phone number, email address, latest password change, role, group(s), tag(s)) of a first user in a set of users.

In another example, the computer system can generate a first data container specifying a first set of data attributes (e.g., file name, file path, file type, access permissions, creation date/time, date/time of last modification, date/time of last access, group(s), tag(s)) of a first subset of data (e.g., a first file, a first folder) in a set of data (e.g., shared folder, a shared drive).

Generally, the computer system can store a set of asset containers in a data repository (or a set of data repositories) for storing attributes characterizing a set of assets.

3.2.2 Other Asset Attributes

The computer system can implement similar methods and techniques to detect, track, and reconcile other attributes of these assets based on values published by these security tools and other tools installed on these assets and deployed on the computer network, such as: user login credentials; user characteristic (e.g., executive, engineer, human resources); geospatial location; whether these assets are on- or off-premises; operating system; open time or active duration of a security tool or software installed on these assets; characteristics of keystrokes input into these assets; etc.

3.3 Asset Manifest

Blocks of the method S100 recite: generating a first manifest of assets during the first time interval based on the first set of asset containers in Block S108; and labeling each asset in the first manifest of assets with a set of attributes exhibited by the asset during the first time interval based on a corresponding asset container in the first set of asset containers in Block S110.

Generally, the computer system can fuse a set of asset containers—derived from isolated, internal logs published by disconnected sources—into one manifest identifying all unique assets connected to the computer network during the target time interval and the particular combinations of sources that detected each unique asset during the target time interval, as shown in FIG. 1.

In one implementation, in Block S108, the computer system can generate a manifest of assets during the target time interval based on the set of asset containers. More specifically, the computer system can generate the manifest of assets based on fixed identifying data and variable status data contained in the set of asset containers.

For example, the computer system can implement methods and techniques described in U.S. patent application Ser. No. 17/720,163 to: compile disparate logs published by various security technologies deployed on devices (e.g., physical devices, virtual devices) connected to the computer network into a first manifest (or "device manifest") for the device asset class; identify all unique devices connected to the computer network during a target time interval (e.g., a past hour); and label each unique device described in the first manifest with an exact combination of tracked security technologies executing on the device during the target time interval (e.g., based on the objects—published by these security technologies during the target time interval—that indicated the device).

The computer system can implement similar methods or techniques to identify and label unique applications into a second manifest (or "application manifest") for the software asset class and to identify and label unique users in a third manifest (or "user manifest") for the user asset class. Additionally, the computer system can implement similar methods or techniques to identify and label unique data (e.g., files, folders, databases) into a fourth manifest for the data asset class.

In one variation, the computer system can identify and label unique devices, applications, users, and data in a single manifest across all asset classes.

In another implementation, in Block S110, the computer system can label each asset in the manifest of assets with a set of attributes exhibited by the asset during the target time interval based on a corresponding asset container in the first set of asset containers. For example, the computer system can label a first asset in the manifest with a first set of attributes exhibited by the first asset during the target time interval based on fixed identifying data and/or variable status data—attributed to the target time interval—contained in a first asset container representing the first asset.

3.3.1 Asset Manifest Update

The computer system can repeat the foregoing methods and techniques to update the manifest with assets—and their attributes—connected to the computer network over time, such as once per hour, twice per day, or daily.

4. ASSET ATTRIBUTE COMBINATIONS

As shown in FIG. 2, after executing the foregoing methods and techniques to generate a manifest of assets—and their attributes—connected to the computer network during a current time interval, the computer system can aggregate a list of asset types represented across these assets and group these attributes into attribute classes, such as: a location attribute class with on- or off-premises attributes; a first security tool attribute class with configuration or version attributes; a second security tool attribute class with configuration or version attributes; an operating system attribute class with operating system and version attributes; etc.

In one implementation, the computer system then automatically defines all possible combinations of all detected attributes across this set of assets.

In another implementation, the computer system: aggregates all attributes of assets connected to the computer network at the current time and/or historically; and presents a list of these attributes—and/or attribute classes containing these attributes—to a user via an operator portal, such as ranked by frequency that these attributes occur across the set of assets detected during the current time interval. In this implementation, the computer system can then prompt the user to: disable (or "mute") irrelevant attributes or attribute classes; or positively identify target attributes, such as presence of particular software, operating system, location, device type, etc. In this implementation, the computer system can then define all possible combinations of the remaining or selected attributes and asset types.

5. ATTRIBUTE CATEGORIES AND ASSET COUNT

Block S112 of the method S100 recites initializing a set of attribute categories including the first attribute category, each attribute category in the set of attribute categories exhibiting a combination of attributes.

Blocks of the method S100 recite, for each attribute category in the set of attribute categories: querying the first manifest of assets for a count of assets in the first manifest of assets that exhibit all attributes of the attribute category in Block S118; and storing the count of assets for the attribute category for the first time interval in Block S122.

Block S124 of the method S100 recites presenting, at an operator portal, a list of the set of attribute categories specifying, for each attribute category in the set of attribute categories, the count of assets for the attribute category for the first time interval.

Figure 3:
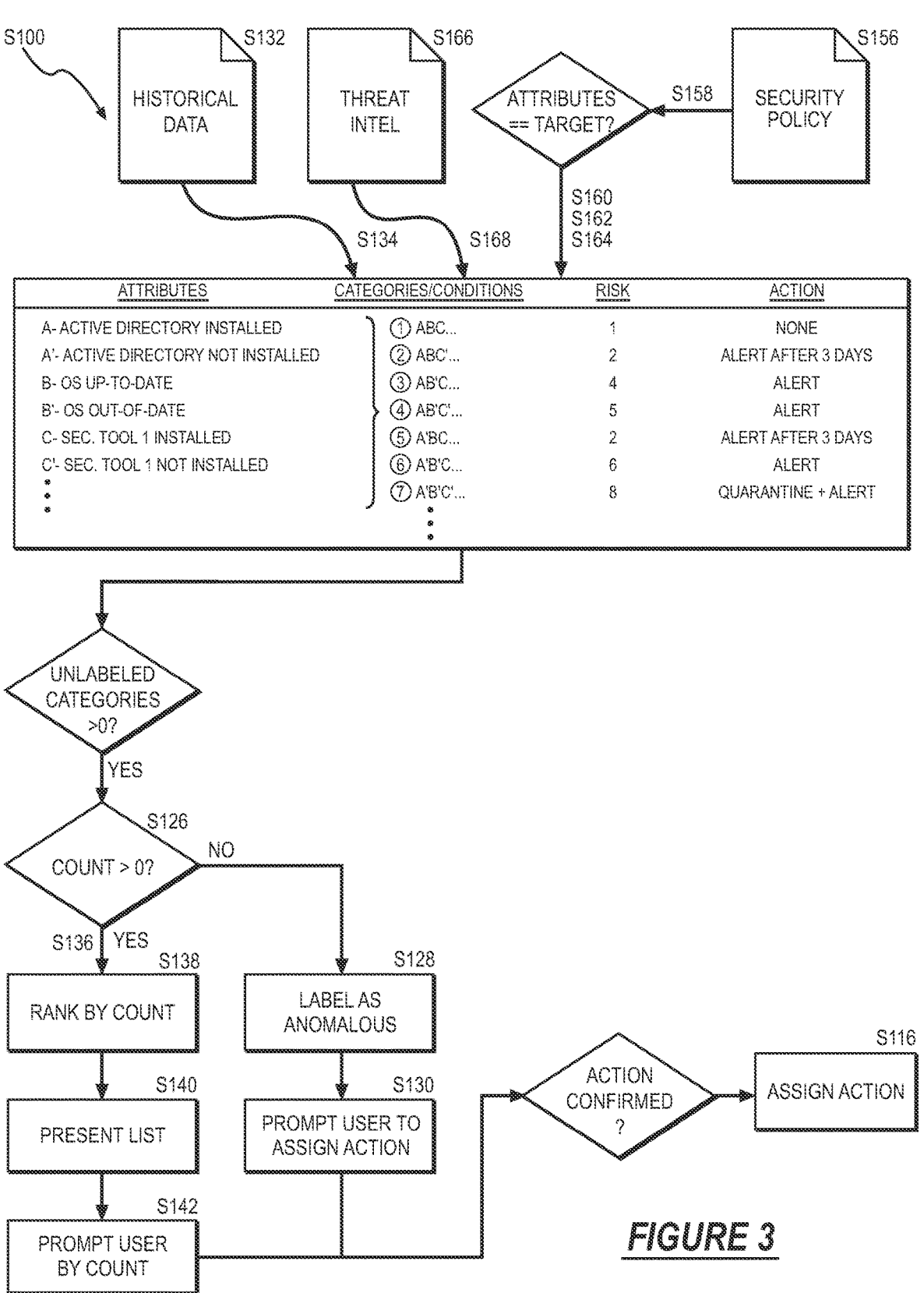
FIG. 3 is a flowchart representation of one variation of the method.

Generally, as shown in FIGS. 2 and 3, the computer system can define an attribute category representing (or exhibiting) a combination of attributes.

In one implementation, in Block S112, the computer system can initialize a set of attribute categories, each attribute category exhibiting one attribute combination. Each attribute category can therefore represent a possible "condition" of an asset on the computer network.

The computer system can then: prompt the user to select a target or nominal time, such as the current time or a time of a known attack or security threat on the computer network; and calculate a frequency (or "count") of assets with attributes that correspond to (or "match") each attribute category at the target time. More specifically, for each attribute category, and therefore for each combination of attributes, the computer system can: query the manifest for a count of assets that contain all attributes of the attribute category during the target time in Block S118; and store this count and target time for the attribute category in Block S122.

In one implementation, in Block S124, the computer system can present, at an operator portal, a list of the set of attribute categories specifying, for each attribute category in the set of attribute categories, the count of assets for the attribute category for the target time interval.

6. ATTRIBUTE CATEGORIES AS CONDITIONS+ACTION ASSIGNMENT

Block S116 of the method S100 recites assigning a first action to the first attribute category.

In one implementation, in Block S116, the computer system can assign an action (or a set of actions) to an attribute category.

For example, the computer system can interface with the user via the operator portal (e.g., executing on a local computing device) to directly assign actions to attribute categories or characterize risk of an asset in these attribute categories to the computer network.

6.1 Zero-Count Attribute Categories

Block S126 of the method S100 recites identifying a subset of attribute categories in the set of attribute categories exhibiting a null count of assets for the first time interval.

Blocks of the method S100 recite, for each attribute category in the subset of attribute categories: labeling the attribute category as anomalous in Block S128; and prompting a user to assign an action to the attribute category in Block S130.

In one implementation, in Block S126, the computer system identifies a first group of attribute categories containing null counts—that is, attribute categories representing combinations of attributes not present in assets on the computer network at the target time. The computer system can then: label these attribute categories as anomalous in Block S128; and, in Block S130, prompt the user to manually assign an action to each of these attribute categories, such as automatic generation of an alert, automatic quarantine, or an automatic discard (or "ignore") action.

In particular, a combination of attributes represented by an attribute category in this first group may be especially unlikely to occur on the computer network and is not instantiated by any asset connected to the computer network at the target time (e.g., the current time). However, an asset in this attribute category may be indicative of an attack on the computer network or a gap in security protocols deployed on the computer network. Accordingly, the computer system can interface with the user to review these anomalous attribute categories and assign actions based on perceived risk of assets with these attribute combinations to the computer network.

6.1.1 Risk Characterization

Blocks of the method S100 recite: assigning a first risk score to the first attribute category in Block S114; and assigning the first action to the first attribute category based on the first risk score in Block S116.

Blocks of the method S100 recite: accessing historical data representing a computer network attack in Block S132; extracting, from the historical data, attributes of assets involved in the computer network attack in Block S134; and assigning the first risk score to the first attribute category based on proximity of the first combination of attributes to the attributes of assets involved in the computer network attack in Block S116.

Generally, the computer system can assign a risk level (or "score") to an attribute category. The computer system can then automatically assign an action (or a set of actions) to the attribute category based on this risk level.

In one implementation, the computer system can prompt the user to assign a risk score to each attribute category (e.g., each attribute category in the first group), such as a risk score between "1" and "10." The computer system can then automatically assign actions to these attribute categories based on these risk scores, such as: mute or no action (e.g., omitting an action assignment) for risk scores of "1"; low-urgency alerts for risk scores of "3"; high-urgency alerts for risk scores of "7"; quarantine with low-urgency alert for risk scores of "8"; and quarantine with high-urgency alert for risk scores of "10"; etc.

In another implementation, the computer system: retrieves a record of attacks or security threats to the computer network and/or to other (similar) computer networks in Block S132; extracts attributes of assets involved in these computer network attacks from these records in Block S134; and automatically characterizes risks of attribute categories in the first group described above based on proximity (e.g., in an n-dimensional feature space; or similarity) of the combinations of attributes in these attribute categories to attributes of assets involved in computer network attacks represented in these records in Block S114. The computer system can then automatically assign actions to these attribute categories based on these risk scores in Block S116, such as described above.

6.2 Nonzero-Count Attribute Categories

Blocks of the method S100 recite: identifying a subset of attribute categories in the set of attribute categories, each attribute category in the subset of attribute categories exhibiting a nonzero count of assets for the first time interval in Block S136; ranking the subset of attribute categories inversely proportional to a count of assets for the first time interval for each attribute category in the subset of attribute categories in Block S138; and presenting, at the operator portal, a list of the subset of attribute categories specifying, for each attribute category in the subset of attribute categories, the count of assets for the attribute category for the first time interval in Block S140.

Block S142 of the method S100 recites, for each attribute category in the subset of attribute categories in order of rank, prompting a user to assign an action to the attribute category.

Similarly, in Block S136, the computer system can identify a second group of attribute categories containing nonzero counts—that is, attribute categories representing combinations of attributes present in assets on the computer network at the target time. In Block S138, the computer system can then rank the second set of categories inversely proportional to their counts—that is, with categories with the lowest counts assigned the highest rank. The computer system can then: present the second set of categories—labeled with their corresponding attributes and asset counts—to the user via the operator portal in Block S140; and prompt the user to investigate and label these attribute categories with actions in order of rank in Bock S142, thereby prioritizing user investigation of rarer (e.g., anomalous) attribute categories, which may represent greater security threats to the network.

In one implementation, a first subset of attribute categories in this second group may represent target conditions for assets connected to the computer network. For example, a first attribute category may represent a target (or "ideal," preferred) combination of attributes including installed security tools and configurations of installed software for off-prem assets of a particular device type. Similarly, a second attribute category may represent a target combination of attributes including installed security tools and different configurations of installed software for on-prem assets of the particular device type. Accordingly, the user may label this first subset of attribute categories with no action or a mute (or "ignore") action.

In this implementation, a second subset of categories may represent a combination of asset attributes that pose a risk to the computer network. For example, a third attribute category may represent a third combination of device type and installed software for off-prem assets with known security gaps. Accordingly, the user may label this second subset of attribute categories with an alert action and alert priority.

In another implementation, a third subset of categories may represent a combination of asset attributes that correspond to known security threats to the computer network. For example, a fourth category may represent a fourth combination of device type, installed software, security tool configuration, and location that indicates a real-time security threat. Accordingly, the user may label this third subset of attribute categories with: an alert action and alert priority; and a quarantine action.

In another implementation, the computer system: retrieves a record of security alerts—such as labeled as "benign" or "malicious" or paired with actions triggered by security analysts—for the computer network and/or for other (similar) computer networks; extracts attributes of assets represented by these alerts; characterizes proximity of the combinations of attributes in these attribute categories to attributes represented by these security alerts; and then automatically assigns actions to these attribute categories based on actions associated with nearby security alerts.

6.3 Histogram

Blocks of the method S100 recite: generating a histogram representing counts of assets for the set of attribute categories for the first time interval in Block S144; and presenting the histogram to a user via an operator portal in Block S148.

Blocks of the method S100 recite, in response to receiving selection of a first cluster of attribute categories in the histogram, for each attribute category in the first cluster of attribute categories: labeling the attribute category as high risk in Block S152; and assigning alert and quarantine actions to the attribute category in Block S154.

In one variation shown in FIG. 2, the computer system: assembles counts of assets in the attribute categories at the target time into a histogram in Block S144; presents the histogram to the user via the operator portal in Block S148; and prompts the user to investigate and assign actions to attribute categories—representing unique combinations of attributes—depicted in the histogram. In response to receiving selection of attribute categories (e.g., a cluster of attribute categories) in the histogram, the computer system can then, for each of these selected attribute categories: label the attribute category with a risk level in Block S114; and assign an action(s) to the attribute category in Block S116.

For example, the operator portal can interface with the user to: highlight a first cluster of attribute categories containing high asset counts; label these attribute categories as normal or target attribute combinations for assets on the computer network; and assign no action to these attribute categories. In this example, the operator portal can similarly interface with the user to: highlight a second cluster of attribute categories containing moderate asset counts (e.g., dozens of assets); label these attribute categories as representing low or moderate risk; and assign an alert action to these attribute categories. Similarly, in this example, the operator portal can interface with the user to: highlight a third cluster of attribute categories containing low asset counts (e.g., fewer than ten assets); label these attribute categories as representing high risk; and assign alert and quarantine actions to these attribute categories.

7. SELECTIVE ATTRIBUTE CATEGORY LABELING

Generally, the computer system and the operator portal can interface with the user to investigate and assign actions to a subset of attribute categories represented in a current or past manifest of assets connected to the computer network. The computer system can then interpolate actions for other attribute categories based on proximity to the attribute categories manually labeled by the user.

For example, the computer system may aggregate many (e.g., hundreds of) unique attribute categories and present these attribute categories to the user in the form of a rank list or histogram, as described above. The computer system can then interface with the user to assign actions to a subset of these attribute categories, such as specifically: a first subset of attribute categories that represent ideal, nominal, or target attributes of assets on the computer network; a second subset of attribute categories that represent known risky asset configurations; and a third subset of attribute categories that represent known or confirmed threats to the computer network. The computer system can then: interpolate risk of other unlabeled attribute categories based on proximity (e.g., distance in an n-dimensional feature space) to attribute categories labeled by the user.

Additionally or alternatively, the computer system can interface with the user to investigate and assign actions to an initial subset of attribute categories following initial deployment on the computer system onto the computer network. Later, in response to detecting assets entering other attribute categories (e.g., as a result of changing attributes among extant assets on the computer network or introduction of new assets to the computer network), the computer system can selectively prompt the user to investigate and assign actions to these other attribute categories.

In yet another implementation, in response to detecting a first count in an existing, unlabeled attribute category (i.e., an attribute category previous associated with a null count), the computer system can automatically: generate alert to investigate and assign an action to the attribute category.

Similarly, in response to detecting a new attribute or new attribute class of assets on the computer network, the computer system can automatically: generate a new set of attribute categories based on combinations of existing and new attributes; and repeat the foregoing methods and techniques to reassign actions to these attribute categories. Additionally or alternatively, the computer system can interpolate actions for a subset of these attribute categories based on proximity to stored attribute categories linked to actions previously assigned or confirmed by the user.

Therefore, the computer system and the operator portal can interface with the user to develop and update action assignments for attribute categories of assets on the computer network over time, such as: with initial priority to attribute category with very high and very low (non-zero) counts; and with subsequent priority to attribute categories with counts increasing at greatest rate.

Additionally or alternatively, the computer system can aggregate many (e.g., thousands of) unique attribute categories and assigned actions to these attribute categories across many (e.g., hundreds of) different computer networks and/or organizations. The computer system can then implement structured data analysis techniques (e.g., linear regression analysis, cluster analysis, k-means clustering, and/or other statistical and machine learning techniques) to: derive relationships and/or correlations between attribute categories and actions; and assign actions to new attribute categories based on these relationships.

For example, in response to detecting assets exhibiting a new attribute category (e.g., as a result of changing attributes among extant assets on the computer network or introduction of new assets to a first computer network of a first enterprise organization), the computer system can: identify organizations (e.g., enterprise organizations) similar to the first enterprise organization; interpolate an action for the new attribute category based on a derived relationship between the attribute category and the action for these organizations and/or based on proximity to stored attribute categories linked to actions previously assigned or confirmed by these organizations; and assign the action to the new attribute category. Additionally or alternatively, the computer system can: identify computer networks similar to the first computer network; interpolate an action for the new attribute category based on a derived relationship between the attribute category and the action for these computer networks; and assign the action to the new attribute category.

8. AUTOMATIC LABELING: TARGET CONDITIONS

Blocks of the method S100 recite: accessing a security policy for the computer network in Block S156; extracting a target combination of attributes defined in the security policy in Block S158; initializing a set of attribute categories including the first attribute category in Block S112, each attribute category in the set of attribute categories exhibiting a combination of attributes; and identifying a subset of attribute categories in the set of attribute categories exhibiting the target combination of attributes in Block S160.

Blocks of the method S100 recite, for each attribute category in the subset of attribute categories: labeling the attribute category as a target condition in Block S162; and omitting an action assignment for the attribute category in Block S164.

In one variation, the computer system automatically identifies no- or low-risk attribute categories based on nominal network security specifications for assets of various types and locations on the computer network.

In one implementation, in Block S156, the computer system accesses a network security specification for the computer network. Then, for each asset type defined in the computer network security specification, the computer system: extracts a target set of attributes defined in the computer network security specification in Block S158; stores this target set of attributes as a target condition for the asset type; identifies a subset of (i.e., one or more) attribute categories—described above—that specify combinations of attributes that fully contain the target set of attributes in Block S160; and labels these attribute categories as target conditions not assigned alerts in Block S162. More specifically, in Block S164, the computer system can omit an action assignment for these attribute categories.

In one example, the computer system implements natural language processing to convert a network security specification into five attributes for a personal computer asset type, including: an on-prem location (e.g., in a location attribute class); installation of four security tools (e.g., in four distinct security tool attribute classes). The computer system then: labels a first attribute category specifying the personal computer asset type, the on-prem location, the four installed security tools as a target condition with no alert; and similarly labels a second attribute category specifying the personal computer asset type, the on-prem location, and only one of the four security tools installed as a risky condition assigned an alert.

In another variation, the computer system can automatically characterize risk of an attribute category based on proximity to the target combination of attributes defined in the computer network security policy. More specifically, the computer system can access a network security specification for the computer network and, for each asset type defined in the computer network security policy, extract a target set of attributes defined in the computer network security specification, as described above. The computer system can then: assign a risk score to a particular attribute category based on proximity (e.g., in an n-dimensional feature space; or similarity) of a combination of attributes—exhibited by the particular attribute category—to a target combination of attributes defined in the computer network security policy; and automatically assign an action to the particular attribute category based on the risk score.

9. AUTOMATIC LABELING: THREAT INTELLIGENCE

Blocks of the method S100 recite: accessing threat intelligence for a security threat in Block S166; extracting, from the threat intelligence, the first combination of attributes and the first action in Block S168; defining the first attribute category exhibiting the first combination of attributes based on the threat intelligence in Block S112; and assigning the first action to the first attribute category based on the threat intelligence in Block S116.

In a similar implementation, in Block S166, the computer system accesses a threat intelligence stream specifying asset attributes correlated with security threats detected on other computer networks (and/or the computer network). Upon receipt of a threat intelligence for a recently identified security threat, the computer system extracts a set of attributes, a risk level, and/or a best-practice action from the threat intelligence in Block S168, such as by: implementing natural language processing techniques to automatically extract these parameters; and implementing methods and techniques similar to those described above to reconcile these parameters to attribute categories and specific attributes of assets connected to the computer network in Block S112.

Alternatively, upon receipt of a threat intelligence for a recently identified security threat, the computer system can prompt the user to review and manually enter a set of attributes, a risk level, and/or an action (e.g., alert, quarantine) indicated by the threat intelligence, such as by matching these parameters in the threat intelligence to attribute classes and specific attributes of assets connected to the computer network.

In this implementation, the computer system can then: identify a subset of (i.e., one or more) attribute categories—such as described above—that contain all attributes derived from the threat intelligence; label these attribute categories as risky conditions; and assign corresponding actions extracted from the threat intelligence or entered manually by the user to these attribute categories.

Therefore, the computer system can map a threat intelligence for a security threat detected on another network onto an attribute category representing a combination of attributes in order to automatically create or update a new condition-action pair for the computer network based on characteristics of assets involved in security attacks on other computer networks.

10. CONDITION-ACTION COMMANDS

Blocks of the method S100 recite: identifying a first subset of assets in the first manifest of assets matching the first attribute category in Block S120, each asset in the first subset of assets exhibiting a set of attributes including the first combination of attributes; and executing the first action, assigned to the first attribute category, on the first subset of assets in Block S170.

The computer system can then store these attribute categories and assigned actions (or "condition-action pairs"). For example, the computer system can then compile these attribute categories and assigned actions (or "condition-action pairs") into a set of automated security commands and load these automated security commands into a network automation tool.

In one implementation, for each attribute category and assigned action (i.e., each condition-action pair), the computer system can: identify a first subset of assets in the current manifest of assets matching the attribute category in Block S120, each asset in the first subset of assets exhibiting a set of attributes including the combination of attributes represented by the attribute category; and execute the action, assigned to the attribute category, on the first subset of assets in Block S170. More specifically, in response to detecting a match between a set of attributes of a particular asset and a combination of attributes represented by an attribute category, the computer system can execute the action—assigned to the attribute category—on the particular asset.

Additionally, the computer system can then execute methods and techniques described above to: compile disparate logs published by various security technologies deployed on devices connected to the computer network into a next manifest (or an updated manifest) during a next time interval; identify all unique assets connected to the computer network during this next time interval; and label each unique asset described in the manifest with an exact combination of attributes of the asset during this time interval. Then, for each asset in this next manifest of assets, the computer system (or the network automation tool) can: match attributes of the asset to a particular attribute category in the set of attribute categories; and execute an action—assigned to the particular attribute category—on the asset.

More specifically, the computer system can: access a second set of objects, generated by the set of sources during a second time interval, representing attributes of a second set of assets in Block S102; partition the second set of objects into a second set of object groups, each object group in the second set of object groups representing a particular asset in the second set of assets in Block S104; generate a second set of asset containers by, for each object group in the second set of object groups, aggregating objects in the object group into an asset container, in the first set of asset containers, representing attributes of a particular asset in the second set of assets in Block S106; generate a second manifest of assets during the second time interval based on the second set of asset containers in Block S108; and label each asset in the second manifest of assets with a set of attributes exhibited by the asset during the second time interval based on a corresponding asset container in the second set of asset containers in Block S10. The computer system can then, for each attribute category and assigned action: identify a second subset of assets in the second manifest of assets matching the attribute category, each asset in the second subset of assets exhibiting a set of attributes including the combination of attributes represented by the attribute category in Block S120; and execute the action, assigned to the attribute category, on the second subset of assets in Block S170.

11. CONDITION CHANGE ALERTS

Blocks of the method S100 recite: identifying the first subset of assets excluding a first asset in Block S172; identifying the second subset of assets including the first asset in Block S174; and, in response to identifying the second subset of assets including the first asset, serving a notification to a user via an operator portal specifying the first asset in the second subset of assets in Block S176.

In one variation, the computer system further interfaces with the user through the operator portal to configure automatic notifications for conditions or condition trajectories of assets on the network.

In one implementation shown in FIG. 2, the computer system interfaces with the user to define a notification for an asset moving from a first attribute category to a second attribute category, such as: an asset moving from a target attribute category into a risky attribute category; or vice versa.

For example, during a first time period, the computer system can identify a first subset of assets—in a first manifest of assets—matching a first attribute category in Block S172, the first subset of assets excluding a first asset. However, during a second time period succeeding the first time period, the computer system can identify a second subset of assets—in a second manifest of assets—matching the first attribute category in Block S174, the second subset of assets including the first asset. In response to identifying the second subset of assets including the first asset, the computer system can serve a notification to a user via an operator portal specifying the first asset in the second subset of assets in Block S176. Accordingly, the computer system can: detect movement of the first asset into the first attribute category between the first and second time periods; and serve a notification to the user specifying this movement.

In a similar implementation, the computer system interfaces with the user to define a notification for an asset moving out of a particular attribute category, such as out of a target attribute category.

In a similar implementation, the computer system interfaces with the user to define a notification for an asset moving into a particular attribute category, such as into a high-risk category.

In another implementation, the computer system interfaces with the user to define a notification for an asset remaining in a particular attribute category for more than a threshold time window, such as: an attribute category representing an outdated operating system for a threshold time window of two weeks from release of a last operating system update; or an attribute category representing absence of a security tool required by the computer network for a threshold time window of three days since a last prompt to install the security tool was sent to the asset.

In a similar implementation, the computer system interfaces with the user to define a notification for an asset that failed to move into a particular attribute category within a particular time window, such as an asset failing to move from a risky attribute category representing an outdated operating system into a target attribute category representing a current operating system within a week of a last prompt to update the operating system sent to the asset.

In yet another implementation, the computer system interfaces with the user to define a notification for an asset moving between attribute categories at a rate greater than a threshold rate, such as entering more than one risky attribute category per day for more than three consecutive days.

However, the computer system can interface with the user to define any other notification based on attribute categories (or "conditions") of assets on the computer network.

The computer system can then: repeat the foregoing methods and techniques to update the manifest described above with assets and their attributes, such as once per hour, twice per day, or daily; match these assets to predefined attribute categories; selectively generate notifications based on notifications configured by the user and current and/or past attributes over these assets; and return these notifications to the user, such as via the operator portal.

12. TRENDS AND VISUALIZATIONS

Blocks of the method S100 recite: querying the first manifest of assets for a first count of assets in the first subset of assets in Block S118; querying the second manifest of assets for a second count of assets in the second subset of assets in Block S118; generating a chart depicting a trendline representing the first count of assets and the second count of assets in Block S178; and presenting the chart for a user via an operator portal in Block S180.

In another variation shown in FIG. 2, the computer system generates visualizations representing trends of attribute categories—that is trajectories of assets characterized by similar attributes.

In one implementation, in response to the user selecting a particular attribute category and a time window with the operator portal, the computer system: queries a set of attribute manifests—described above—for quantities and unique identifiers of assets in the particular attribute category during the time window in Block S118; populates a trendline in a chart with quantities of assets in the particular category connected to the computer network at particular times within the time window in Block S178; and renders the chart for the user in Block S180. Furthermore, in response to the user selecting a particular time or corresponding point on the chart, the computer system can: aggregate a list of unique identities of assets in the particular attribute category at the particular time; and present this list to the user.

In particular, to enable the user to find individual assets represented by points or line segments along the trendline, the computer system can link time intervals represented in the chart to unique identifiers of assets in this particular attribute category during the time window. For example, in response to the user selecting a point or line segment on the chart, the computer system can: read a target time corresponding to the point or a target time window corresponding to the line segment; query the computer network status record for unique identifiers of assets that exhibit the attributes specified in this second subscription category at the target time or during the target time window; and return a list of unique identifiers to the user, such as including MAC address, IP address, attributes of these asset at the current time, and/or usernames or email addresses of individuals associated with these assets. Then, in response to the user selecting a set of unique identifiers from this list, the computer system can: enable a list of predefined actions (e.g., quarantine, flag for operating system update, push software update reminder, push automatic software update); and automatically execute an action—selected from this list by the user—on these assets.

In another implementation, the computer system interfaces with the user to configure subscriptions to categories of interest, such as: a target attribute category for a particular asset type; a moderate-risk category for out-of-date operating systems for personal computer asset type; and/or a high-risk category for assets omitting two critical security tools; etc. Following each update of the manifest of assets and their attributes, the computer system: implements the foregoing methods and techniques to generate a set of visualizations—based on assets and their attributes represented in current and past manifests—responsive to the user's subscriptions; and serves these visualizations to the user.

However, the computer system and the operator portal can implement any other methods or techniques to generate a visualization of attributes of assets on the network over time.

12.1 Source Deployment Efficacy

Blocks of the method S100 recite: identifying a second subset of assets, in the first set of assets, configured with the first source and the second source based on the first subset of objects and the second subset of objects in Block S182; identifying a third subset of assets, in the first set of assets, configured with the first source and excluding the second source based on the first subset of objects and the second subset of objects in Block S184.

Blocks of the method S100 recite: labeling each asset in the first manifest of assets with a combination of sources, in the set of sources, deployed on the asset based on a corresponding asset container in the first set of asset containers in Block S186; receiving, at an operator portal, selection of a subset of sources in the set of sources in Block S188; and rendering, at the operator portal, a visualization depicting quantities of assets labeled with permutations of the subset of sources in the first manifest in Block S190.

Blocks of the method S100 recite, in response to a security policy specifying deployment of the first source and the second source: generating a prompt to selectively investigate assets, in the third subset of assets, for absence of the second source in Block S192; and serving the prompt to security personnel affiliated with the computer network in Block S194.

Generally, the computer system can: access a set of objects published by a set of sources designated for deployment on the computer network; identify correspondence between these objects; fuse this correspondence into a manifest of assets containing one identifier for each asset represented in at least one object in this set of objects; and label each asset in the manifest with each source—in the set of sources—that published at least one object corresponding to the asset.

For example, in Block S182, the computer system can identify a first subset of assets configured with a first source and a second source—in the set of sources—based on a first subset of objects published by the first source and a second subset of objects published by the second source. Similarly, the computer system can identify a second subset of assets configured with the first source and excluding the second source based on the first subset of objects and the second subset of objects in Block S184.

Figure 4:
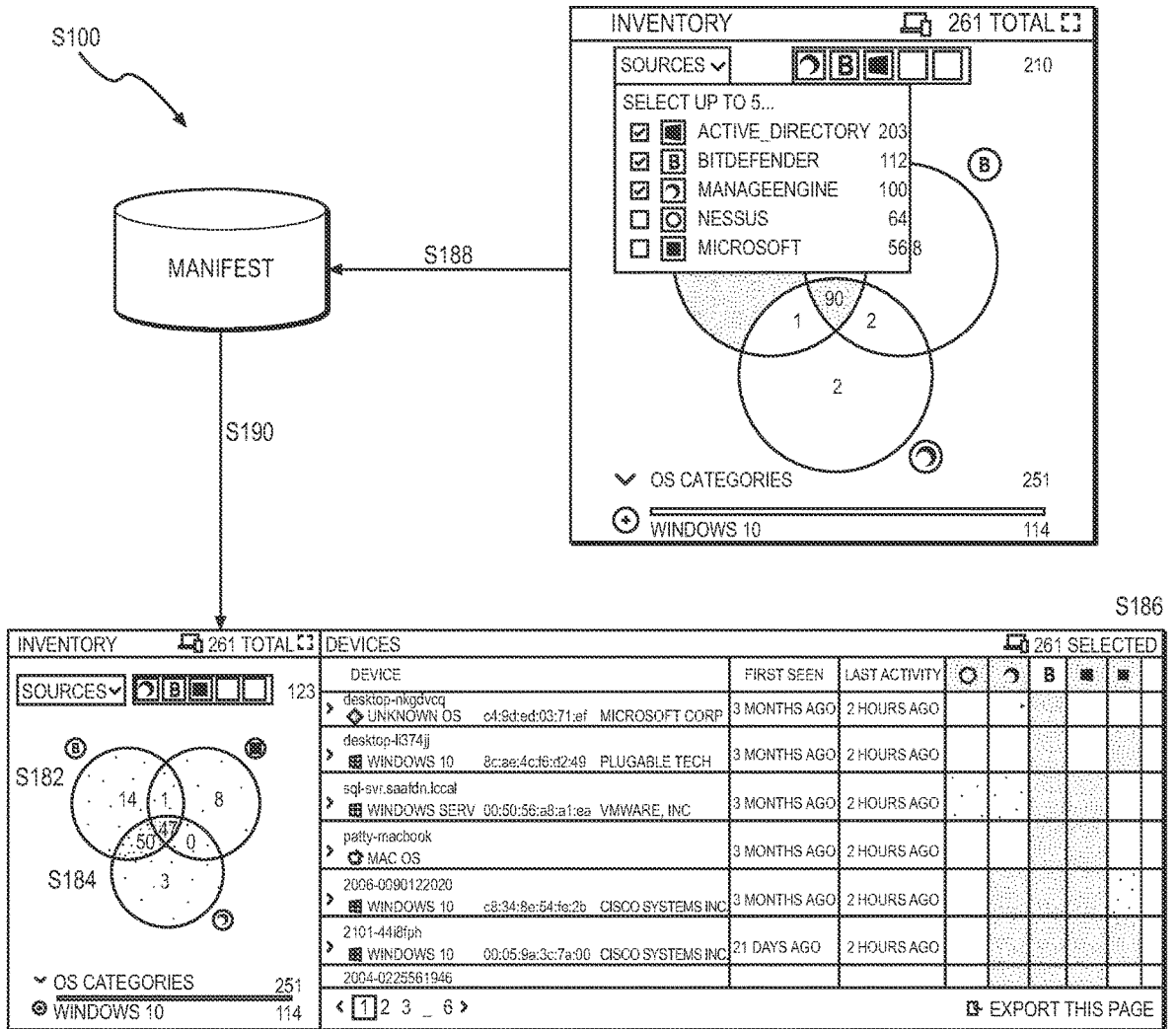
FIG. 4 is a flowchart representation of one variation of the method.

The computer system can then interface with a user (e.g., a security analyst, a network administrator) via an operator portal: to receive selection of a set of sources of interest (e.g., between one and five sources, inclusive) in Block S188; and to generate a visualization representing unique assets (e.g., endpoint devices) on which each of these selected sources is deployed and active during the target time interval and depicting quantities of assets labeled with permutations of the selected sources in Block S190, as shown in FIG. 4.

Figure 5:
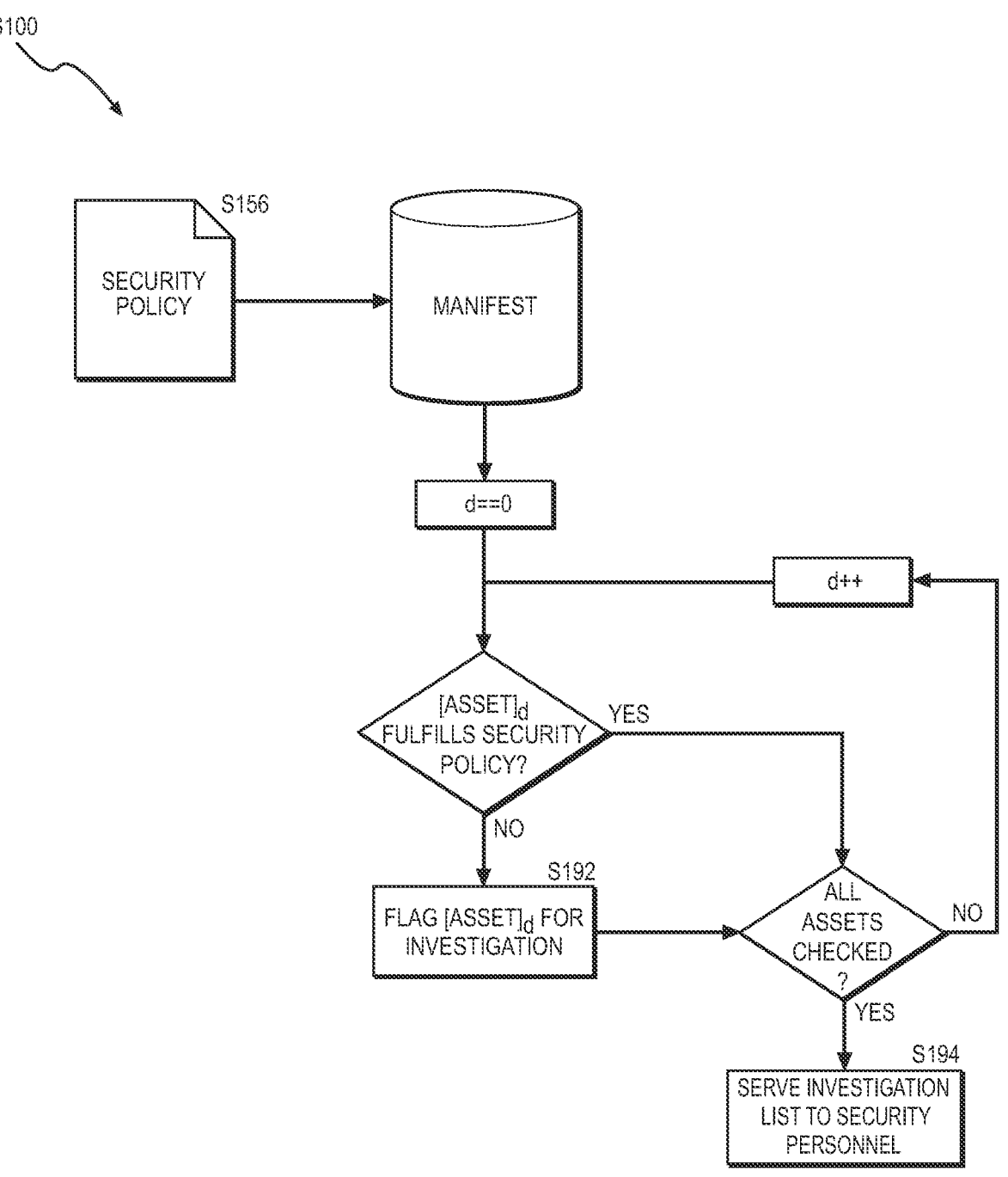
FIG. 5 is a flowchart representation of one variation of the method.

In one variation, as shown in FIG. 5, in Blocks S156, S192, and S194, the computer system: accesses a security policy for the computer network; and generates a prompt to selectively investigate endpoint devices based on deviation from the security policy. More specifically, the computer system can: access the security policy that defines rules for combinations and configurations of sources deployed on endpoint devices connected to the computer network; compare these rules to endpoint device configurations recorded in the current manifest; detect differences between these rules and configurations of individual endpoint devices (or groups, clusters of endpoint devices); and selectively prompt security personnel to investigate these endpoint devices. For example, in response to identifying a particular endpoint device that deviates from a source configuration rule contained in the security policy, the computer system can prompt security personnel to: quarantine the endpoint device; push a systems or security technology update to the endpoint device; or limit account or user access at the endpoint device until the endpoint device is properly reconfigured.

12. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

We claim:

1. A method comprising:
accessing a first set of objects, generated by a set of sources during a first time interval, representing attributes of a first set of assets;
grouping the first set of objects into a first set of object groups, each object group in the first set of object groups representing an asset in the first set of assets;
for each object group in the first set of object groups, aggregating objects in the object group into an asset container, in a first set of asset containers, representing attributes of an asset in the first set of assets;
generating a first manifest of assets in communication with a computer network during the first time interval based on the first set of asset containers;
identifying a first subset of assets, specified in the first manifest of assets, corresponding to a first attribute category characterized by a first combination of attributes, each asset in the first subset of assets exhibiting a set of attributes comprising the first combination of attributes; and
by a computer system, executing a first action, assigned to the first attribute category, on the first subset of assets.

2. The method of claim 1, further comprising:
generating a second set of asset containers by, for each asset in a second set of assets, aggregating objects, generated by the set of sources during a second time interval, representing the asset into an asset container, in the second set of asset containers, representing attributes of the asset in the second set of assets;
generating a second manifest of assets in communication with the computer network during the second time interval based on the second set of asset containers;
identifying a second subset of assets specified in the second manifest of assets, each asset in the second subset of assets exhibiting a set of attributes comprising the first combination of attributes; and
executing the first action on the second subset of assets.

3. The method of claim 2, further comprising:
identifying the first subset of assets excluding a first asset;
identifying the second subset of assets comprising the first asset; and
in response to identifying the second subset of assets comprising the first asset, serving a notification via an operator portal specifying the first asset in the second subset of assets.

4. The method of claim 2, further comprising:
generating a chart depicting a trendline representing:
a first count of assets in the first subset of assets; and
a second count of assets in the second subset of assets; and
serving the chart via an operator portal.

5. The method of claim 1, further comprising:
defining the first attribute category based on a set of threat intelligence specifying the first combination of attributes; and
assigning the first action to the first attribute category based on the set of threat intelligence specifying the first action.

6. The method of claim 1, further comprising assigning the first action to the first attribute category based on a first risk score assigned to the first attribute category.

7. The method of claim 6, further comprising:
extracting, from a set of historical data representing a computer network attack, attributes of assets involved the computer network attack; and
assigning the first risk score to the first attribute category based on proximity of the first combination of attributes to the attributes of assets involved in the computer network attack.

8. The method of claim 1, further comprising, for each attribute category in a set of attribute categories and exhibiting a combination of attributes:
querying the first manifest of assets for a count of assets, in the first manifest of assets, that exhibit all attributes of the attribute category; and
storing the count of assets within the attribute category for the first time interval.

9. The method of claim 8, further comprising:
generating a first count of assets within the first attribute category for the first time interval; and
serving the first count of assets via an operator portal.

10. The method of claim 8, further comprising:
identifying a subset of attribute categories in the set of attribute categories, each attribute category in the subset of attribute categories exhibiting a nonzero count of assets for the first time interval;
for each attribute category in the subset of attribute categories:
identifying the count of assets within the attribute category for the first time interval; and
specifying the count of assets in a list of the subset of attribute categories; and
serving the list via the operator portal.

11. The method of claim 10, further comprising:
for each attribute category in the subset of attribute categories, ranking the attribute category based on the count of assets within the attribute category for the first time interval; and
prompting a user to investigate the subset of attribute categories in order of rank.

12. The method of claim 8, further comprising:
generating a graphical representation of counts of assets within the set of attribute categories for the first time interval; and
serving the graphical representation via an operator portal.

13. The method of claim 12:
wherein generating the graphical representation comprises generating a histogram representing counts of assets within the set of attribute categories for the first time interval; and
further comprising, for each attribute category in a first cluster of attribute categories in the histogram:
labeling the attribute category with a risk level; and
assigning an action to the attribute category.

14. The method of claim 8, further comprising prompting a user to assign the first action to the first attribute category, in the set of attribute categories, exhibiting a null count of assets during a second time interval preceding the first time interval.

15. The method of claim 1, further comprising assigning the first action to the first attribute category, the first action comprising quarantining an asset.

16. The method of claim 15, further comprising:
initializing a set of attribute categories comprising the first attribute category and a second attribute category, each attribute category in the set of attribute categories characterized by a combination of attributes; and assigning a second action to the second attribute category, the second action comprising serving an alert via an operator portal.

17. The method of claim 1, further comprising:

extracting a target combination of attributes defined in a security policy for the computer network;

initializing a second attribute category characterized by the target combination of attributes; and withholding an action assignment for the second attribute category.

18. The method of claim 1, further comprising:

labeling each asset in the first manifest of assets with a combination of sources, in the set of sources, deployed on the asset;

receiving selection of a subset of sources in the set of sources; and rendering a visualization depicting quantities of assets labeled with permutations of the subset of sources in the first manifest.

19. A method comprising:

accessing a set of objects, generated by a set of sources during a target time interval, representing attributes of a set of assets comprising a first asset;

assigning the set of objects to a set of object groups comprising a first object group representing the first asset;

generating a first asset container in a set of asset containers, the first asset container:

comprising objects in the first object group; and representing a first set attributes exhibited by the first asset during the target time interval;

by a computer system, executing a first action, assigned to a first attribute category characterized by a first combination of attributes, on the first asset in response to the first set of attributes comprising the first combination of attributes.

20. A method comprising:

accessing a set of objects, generated by a set of sources during a target time interval, representing attributes of a set of assets;

grouping the first set of objects into a first set of object groups, each object group in the first set of object groups representing an asset in the set of assets;

for each object group in the first set of object groups, aggregating objects in the object group into an asset container, in a set of asset containers, representing attributes exhibited by an asset in the set of assets during the target time interval;

based on the set of asset containers, identifying a first subset of assets in the set of assets corresponding to a first attribute category characterized by a first combination of attributes, each asset in the first subset of assets exhibiting a set of attributes comprising the first combination of attributes; and by a computer system, executing a first action, assigned to the first attribute category, on the first subset of assets.

* * * * *